United States Patent [19]

Tegtmeier et al.

[11] 3,935,896

[45] Feb. 3, 1976

[54] METHOD FOR COOLING A CONTINUOUSLY CAST STRAND

[75] Inventors: Richard J. Tegtmeier, Newtown, Pa.; Jimmy L. Helms, Ridgewood; Karl L. Backhaus, West New York, both of N.J.

[73] Assignee: Concast Incorporated, New York, N.Y.

[22] Filed: Feb. 28, 1974

[21] Appl. No.: 447,006

Related U.S. Application Data

[62] Division of Ser. No. 324,541, Jan. 16, 1973, Pat. No. 3,877,510.

[52] U.S. Cl. .................................................. 164/89
[51] Int. Cl.² ........................................ B29D 11/124
[58] Field of Search................ 164/89, 283 R, 283 S

[56] References Cited

UNITED STATES PATENTS

| | | | |
|---|---|---|---|
| 3,341,133 | 9/1967 | Hruby et al. | 239/598 |
| 3,753,793 | 8/1973 | Wagner et a;/ | 164/89 X |

FOREIGN PATENTS OR APPLICATIONS

| | | | |
|---|---|---|---|
| 1,476,702 | 3/1967 | France | 164/283 R |
| 1,957,758 | 8/1970 | Germany | 164/89 |
| 970,284 | 9/1964 | United Kingdom | 164/89 |

*Primary Examiner*—R. Spencer Annear
*Attorney, Agent, or Firm*—Werner W. Kleeman

[57] ABSTRACT

A method of cooling a continuously cast strand, particularly a steel strand, in a secondary cooling zone of a continuous casting plant wherein a spray nozzle disposed at the region of at least two consecutively spaced guiding means produces a spray pattern of liquid coolant, typically water, which impinges the surface of the cast strand with a substantially uniform distribution of the coolant and a substantially uniform impingement force at least over the major portion of the transverse width dimension of such cast strand. The invention further contemplates feeding the liquid coolant into the nozzle so as to flow initially essentially in the axial extent thereof and then to depart therefrom in a direction extending transversely with respect thereto to form such spray pattern of liquid coolant.

22 Claims, 11 Drawing Figures

METHOD FOR COOLING A CONTINUOUSLY CAST STRAND

CROSS-REFERENCE TO RELATED CASE:

This is a divisional application of our commonly assigned, copending U.S. application Ser. No. 324,541, filed Jan. 16, 1973, now U.S. Pat. No. 3,877,510, granted Apr. 15, 1975.

BACKGROUND OF THE INVENTION

The invention of this divisional application relates to a new and improved method of cooling a continuously cast strand, particularly castings having a substantially rectangular cross-sectional configuration, and especially a steel strand.

Continuous casting operations employ the technique of casting liquid metal into a cooled open-end mold, also known in the art as a continuous casting mold, and the cast strand formed therein is continuously withdrawn therefrom. After the casting has been withdrawn from the continuous casting mold, it has not as yet completely solidified, therefore additional heat must be removed at a secondary cooling zone. During the casting of strands of rectangular cross-section, for example blooms or slabs, it is conventional practice to spray water, functioning as a liquid coolant, in the form of flat spray patterns or fans onto the surface of the continuously cast strand. A common practice in the art is to arrange a plurality of adjacently situated spray nozzles having a flat spraying characteristic in such a manner that the spray patterns or fans emanating from neighboring spray nozzles slightly overlap one another in order to strive to attain uniform cooling across the width of the continuously cast strand. This prior art arrangement of spray nozzles, which aims at providing a relatively uniform water distribution across the width of the continuously cast strand, can only operate over small transverse widths of the strand. As a result, only discrete surface portions across the width of the strand can be impinged by a single spray pattern or fan. Consequently, it is a requirement of this type of cooling system that a plurality of nozzles be arranged in respective rows across the width of the strand.

Another cooling arrangement of the state-of-the-art contemplates the use of only a single spray nozzle which is intended to spray the liquid coolant over the complete width of a slab. A decisive drawback of this arrangement resides in the fact that owing to the characteristics of the conventionally employed nozzles, the density of the spray water and thus the cooling effect at the central region of the slab is much greater than at the outer regions or portions. Additionally, the impingement forces are not uniform and the actual area of impingement by the spray pattern follows the course of a curved line or arc extending across the width of the slab. Moreover, the spray pattern or fan is not sharply defined, in fact, is unstable as the pressure varies. For these reasons, the succession of rollers which serve to guide and support the slab during its movement through the secondary cooling zone are detrimentally impinged by the spray patterns, causing uncontrollable cooling since a disturbing or interfering action is exerted upon the spray patterns. In an attempt to overcome these notable drawbacks, it has been proposed to provide a greater spacing between the successive guide rollers. As a practical matter, this is not readily possible because, due to the increased roller spacing and with casting conditions where high casting speeds are required, it has been found that the continuously cast strand, which has a relatively thin solidified outer layer around a liquid crater, tends to undesirably bulge.

A further drawback found to exist in the cooling systems heretofore proposed, resides in the tendency of the nozzles which were heretofore employed to become clogged due to the accumulation of particles which are present in the liquid coolant, typically cooling water. This again produces a non-uniform cooling effect upon the strand and also demands periodic cleaning of the nozzles, with the resultant undesirable downtime of the casting equipment and loss of production.

Modern steel casting plants must be extremely versatile in operation and capable of producing a wide range of slab sections and qualities which, in turn, requires variations of the casting speed. Metallurgical considerations make it incumbent to adapt the quantity of sprayed cooling water to the amount of heat intended to be removed within the secondary cooling zone, that is to say, as a function of the casting speed. The amount of cooling water is controlled by the water pressure prior to entering the relevant spray nozzle. It is also desirable to maintain the distribution of the spray water as constant as possible. The nozzles of conventional design heretofore employed in the cooling systems of the prior art continuous casting plants possess the drawback that as the pressure of the coolant varies, the spray water distribution also changes considerably and to a certain extent also the spray angle. Consequently, this again causes uncontrollable cooling of the continuously cast strand.

SUMMARY OF THE INVENTION

Therefore, in consideration of the foregoing drawbacks and limitations of the prior art proposals, it is an important object of the present invention to provide an improved method of cooling a continuously cast strand, wherein it is possible to promote essentially uniform cooling of the strand through the use of only a single spray pattern between two neighboring guide rolls and which extends across substantially the entire width of the strand, when desired, and further, wherein the density of the coolant and distribution thereof over the strand impingement area, is substantially uniform.

Another object of the present invention aims at simplifying the construction of a continuous casting plant by replacing the conventional design of plural spray nozzles arranged in respective rows across the strand transversely with respect to its longitudinal axis, by a single spray nozzle in each row.

A further object of the present invention is directed to the provision of an improved method of cooling a continuously cast strand by employing a novel cooling nozzle for a continuous casting plant, which is simple in construction and design, extremely effective in providing substantially uniform cooling of the cast strand, affording a relatively large spray angle, and providing substantially uniform distribution of the coolant and an essentially constant impingement force over at least the major part of the transverse width dimension of the strand.

It is also an object of this invention to provide a cooling method for cast strands employing a nozzle in the cooling system of a continuous casting plant, which nozzle is relatively simple in construction and design while its large opening avoids to a great extent clogging thereof, to thus improve the efficiency of the plant and the economies in operation.

Another object of this invention is related to the provision of a new and improved method of cooling a continuously cast strand with a cooling system of a continuous casting plant wherein there is provided a sharply defined spray pattern and impingement area therefor defined by substantially straight parallel lines and which impingement area extends extensively perpendicular to the lengthwise axis of the strand across the width thereof.

A further object of this invention contemplates the provision of a new and improved method of cooling a continuously cast strand by producing a substantially uniform distribution and a substantially constant spray angle of the spray water over a wide range of coolant pressures and an essentially stable spray pattern over a wide range of spray angles.

Yet a further object of the present invention relates to an improved method of cooling a continuously cast strand wherein the liquid coolant enters a cooling nozzle in one direction and departs therefrom as a spray pattern in another direction with respect to the incoming flow direction of the coolant, which spray pattern has a large width in the direction of the strand width, but a small and substantially uniform thickness in the direction of the longitudinal axis of the strand.

Now in order to implement these and still further objects, which will become more readily apparent as the description proceeds, the method of cooling a continuously cast strand, typically of rectangular cross-section, as contemplated by this development, entails arranging one spray nozzle for liquid coolant at the region of two consecutive guiding means for the cast strand moving along a predetermined path of travel, and moving the cast strand along the predetermined path of travel defined by the spaced guiding means. Liquid coolant is delivered to the spray nozzle and there is produced therefrom one substantially flat spray pattern which is directed towards the surface of the moving cast strand. The flat spray pattern of liquid coolant impinges the strand at an impingement area which extends transversely across the surface of the cast strand, and with essentially uniform distribution of the coolant across at least the major portion or extent of the width of the cast strand, in order to substantially uniformly cool the strand across its transverse width dimension or extent.

It is also within the contemplation of the invention to produce a substantially uniform impingement force for the liquid coolant at the surface of the strand, at least over the major transverse extent thereof. A further aspect of the invention infeeds the liquid coolant into the spray nozzle in a first direction and has it depart therefrom in a second direction which differs from said first direction, typically to infeed the coolant in the lengthwise or axial flow direction of the nozzle and to have the liquid coolant depart therefrom in a direction transversely with regard to such lengthwise direction. A still further aspect of the invention contemplates controlling the spray angle of the spray pattern or fan of coolant emerging from a single nozzle which acts across the transverse width of the strand.

The method aspects of this development have been found to afford essentially uniform cooling of the continuously cast strand, and importantly, with one and the same nozzle, it is possible to cool castings of various dimensions and qualities of metallurgical composition at different casting speeds because the distribution of the liquid coolant remains essentially uniform and the spray angle essentially constant throughout a wide range of coolant pressures. Moreover, there is realized an essentially uniform spray water density producing an essentially uniform distribution of the liquid coolant and a substantially constant impingement force at least over the major extent of the transverse width dimension thereof.

BRIEF DESCRIPTION OF THE DRAWINGS

The invention will be better understood and objects other than those set forth above, will become apparent when consideration is given to the following detailed description thereof. Such description makes reference to the annexed drawings wherein essentially the same reference characters have been used throughout for the same components, and wherein.

DETAILED DESCRIPTION OF THE PREFERRED EMBODIMENTS

Figure 1:
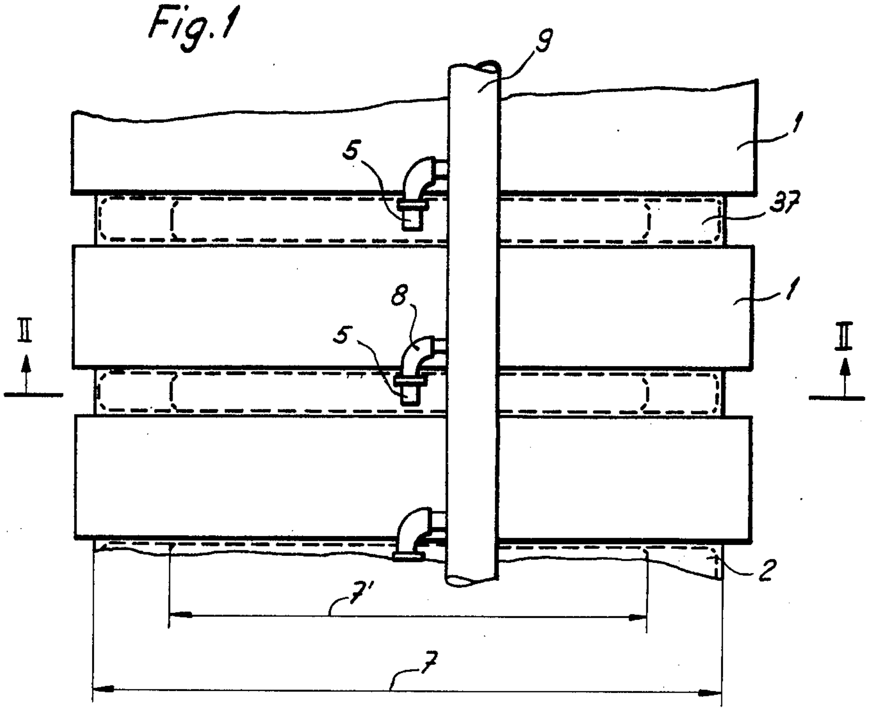
FIG. 1 is a fragmentary top plan view of a cooling system or apparatus designed in accordance with the teachings of the present invention for substantially uniformly cooling the surface of a continuously cast strand.

Referring now to the drawings, and considering the invention in greater detail, it is to be remarked that only enough of a continuous casting plant has been depicted to enable those versed in the art to fully understand the significant concepts of this development. Hence, in FIGS. 1 and 2, there is shown a portion of the secondary cooling zone of a continuous casting plant which incorporates longitudinally spaced guiding means, here in the form of guide rollers 1 which define a path of travel for a continuously cast strand 2 within such secondary cooling zone. As should be apparent to those familiar with this particular field of technology, the rollers 1 are typically located at opposite surfaces of the throughpassing continuously cast strand 2. In the exemplary embodiment of the invention there is arranged at the region of each two consecutive neighboring guide rollers 1 a single spray nozzle 5 from which emanates a spray fan or pattern 3 of liquid coolant, usually water, which is directed between the associated neighboring guide rollers 1, as best seen by referring to FIG. 3. Each such spray pattern impinges the confronting surface of the cast strand 2 at an impingement area 37 which is defined by substantially straight parallel lines and which impingement area extends essentially transversely across the strand and preferably covers the entire width thereof. Further, it should be recognized that each spray fan or pattern 3 extensively moves into the associated roller gap between consecutive guide rollers 1. The spray nozzles 5 which constitute an important part of the cooling system, and which will be disclosed in greater detail hereinafter in conjunction with FIGS. 4–11 inclusive, are connected in any convenient fashion, for instance through the use of coolant infeed conduits 8, with a common coolant feeder or distributor pipe 9, which, in turn, receives liquid coolant from a convenient supply source. Hence, the common feeder or distributor pipe 9 constitutes a convenient means for supplying and distributing the liquid coolant to the individual spray nozzles 5 through the agency of their associated conduits 8. At this point, it should be remarked that for each given transversely extending portion of the cast strand intended to be impinged by the spray pattern, there advantageously only need be provided one spray nozzle 5 capable of delivering a spray pattern over at least essentially the entire width of such cast strand.

Figure 2:
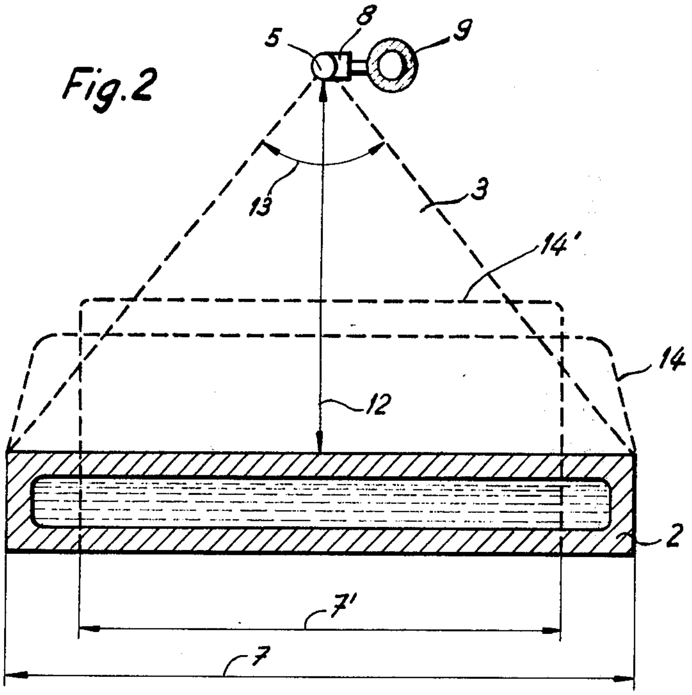
FIG. 2 is a cross-sectional view of the embodiment depicted in FIG. 1, taken substantially along the line II—II thereof.

Now the spray nozzles 5 are mounted at a certain distance, generally indicated by reference character 12 in FIG. 2, from the confronting surface of the cast strand 2, and this distance is selected as a function of the spray angle 13 so as to provide impingement of liquid coolant across the width of the strand. As also shown in FIG. 2, the coolant spray pattern which emanates from the spray nozzle 5 in each case possesses a beneficial flat characteristic, for instance as indicated by phantom line 14 for the slab width 7, in other words, the density of the spray water and the distribution thereof at the impingement area of the cast strand is substantially uniform or constant at least over the major extent of the transverse width dimension thereof, and the strand is advantageously cooled in a uniform manner across its transverse width dimension. Further, it has been found that the spray nozzles tend to generally produce an impingement force which is also substantially constant over at least the major transverse width dimension of the cast strand.

The spray pattern or fan 3 which impinges the surface of the cast strand 2 emerges from a slotted outlet opening of the associated spray nozzle 5 which will be described in greater detail hereinafter. As will be apparent from the discussion to follow, this slotted outlet opening is located in a plane which extends across the width of the cast strand and perpendicular to the lengthwise axis of such cast strand.

If it is desired to cast a different strand, for instance a slab having a different width as indicated by reference character 7′ in FIG. 2, then it is advantageously possible to still utilize the same cooling system and nozzles. Usually, a slab having a smaller cross-section but of the same chemical composition can be cast with a higher casting speed. In this case the amount of cooling water can be increased by appropriately adjusting the coolant or water pressure as is well known in this art. Purely by way of example it is here mentioned that the pressure of the coolant water has been adjusted over a range of approximately 10 psig to 150 psig. With the cooling method and cooling system of this development, it is possible to also uniformly cool a slab having a smaller width 7′ across its impingement area, as indicated by the water distribution curve shown by the phantom line 14′. Once again, there is provided a substantially uniform distribution of the spray water across at least the major extent of the width of the slab and desirably also a substantially constant impingement force at least over the major extent of such slab width.

It is one of the advantages of this development that the spray characteristics do not essentially change throughout a relatively wide range of inlet water pressures, that is to say, the curve of the spray characteristics remains substantially rectangular over the width of the strand, wherefore it is possible to cool slabs of various cross-sections or chemical compositions with one and the same nozzle while producing substantially constant or uniform water distribution and substantially constant impingement force over at least the major extent of the transverse width of such slab.

Another benefit of notable distinction which can be realized with the invention, in contrast to the prior art cooling systems, is that it is possible to substitute a single nozzle for the heretofore used plural nozzles which spray coolant over the slab width. For instance, to cool a steel slab of 85 inches width approximately 10 nozzles arranged in a row across the wide faces of the slab were heretofore required with the conventional cooling equipment of the prior art casting plants. The reduction to a single nozzle for each transverse extending area of the slab brings with it obvious advantages merely in terms of the simplicity of design of the cooling system and the less expense associated therewith, but also for instance in operation, since less clogging of the nozzle occurs due to the larger size of the spray nozzle outlet opening, notwithstanding the other significant advantages, especially as concerns the essentially uniform cooling action to which the cast strand is exposed.

Figure 3:
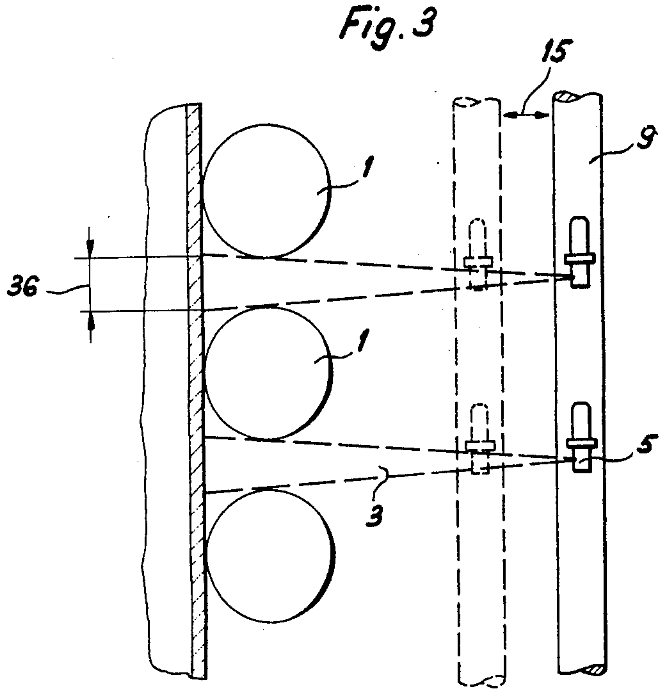
FIG. 3 is an end view of the arrangement of FIG. 1, looking from the left side thereof, and depicting the spray pattern or fan emanating from each spray nozzle.

In order to avoid overspraying and therefore to save on the consumption of water, or other liquid coolant, it is of course possible to appropriately adjust the distance 12 between the nozzles 5 and the surface of the cast strand 2, and this can be done through the use of any suitable means, such as, for instance, of the type disclosed in U.S. Pat. No. 3,468,362. Hence, as shown in FIG. 3, the distributor infeed or supply pipe 9 together with the spray nozzles 5 can be selectively shifted towards or away from the surface of the continuously cast strand. In fact, in the showing of FIG. 3, the distributor pipe 9 can be moved in both directions, as schematically indicated by the double-headed arrow 15 so as to assume a selectable spacing from the strand surface. Each spray pattern or fan is sharply defined and passes between the guide rollers 1 without impinging or essentially impinging upon the guide rollers or producing uneven cooling due to a disturbed spray pattern.

With the benefit of the foregoing discussion of the cooling system of this development, there will now be considered in detail in conjunction with FIGS. 4 to 9, different constructional embodiments of spray nozzles which can be used to advantage in such a cooling system.

Figure 4:
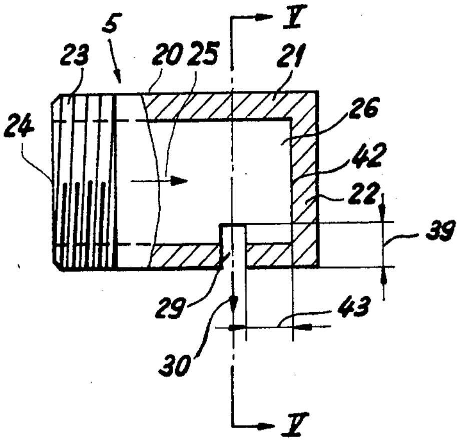
FIG. 4 is a partial longitudinal sectional view of a first embodiment of nozzle construction for use for instance in the cooling system of FIGS. 1–3 inclusive.
Figure 5:
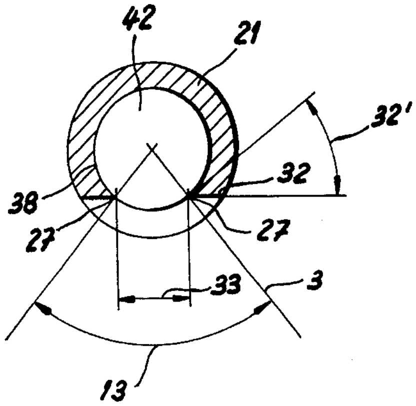
FIG. 5 is a cross-sectional view of the nozzle depicted in FIG. 4, taken substantially along the line V—V thereof.
Figure 6:
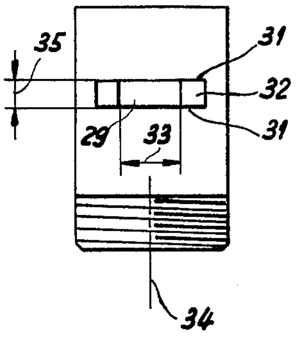
FIG. 6 is a bottom view of the nozzle of FIG. 4, the showing of FIG. 6 being turned 90° in vertical direction to facilitate the illustration thereof.

Turning initially therefore to the showing of FIGS. 4 to 6 inclusive, there is depicted therein a first embodiment of spray nozzle 5 which can be incorporated in the cooling system of FIGS. 1 to 3 for carrying out the novel cooling technique of this invention. It will be understood that the spray nozzle 5 incorporates a nozzle body member 20, for instance in the form of a tubular portion or nipple 21 closed at one end by a fixed end wall 22 and provided at the other end with a threaded portion 23 adapted to be connected with an associated conduit, such as the conduit 8 for the liquid coolant, water for instance, which is supplied by the distributor pipe 9. In the embodiment under consideration, the end wall 22 is shown formed integral with the tubular portion 21 of the nozzle body member 20. At the opposite end of the nozzle body member 20 remote from the blind end of the nozzle defined by end wall 22, there is provided inflow means incorporating an inlet opening 24 which communicates with an axially directed flow passageway or passage 26 which extends to the region of the end wall 22. The axially directed flow passage 26 is bounded by the smooth inner wall 38 of the nozzle body member 20. Pressurized coolant is introduced through the inlet opening 24 and moves axially through the passage 26. The nozzle 5 is also provided with outflow means incorporating a slotted outlet opening 29. The tubular portion 21 is thus shown provided with a slotted outlet opening 29 which forms a discharge for the water emanating from the nozzle 5 in the form of a spray fan or pattern 3 having a large width in the direction of the strand width, but a small and uniform thickness in the direction of the longitudinal axis of the strand. The flow direction of the emerging water, as indicated by the arrow 30, will be recognized to be different from the flow direction 25 of the incoming water and its axial flow through the nozzle passage 26. In fact, the flow directions will be seen to be essentially mutually perpendicular to one another, the incoming water flowing axially through the tubular portion 21 and the outflowing water extending transversely with regard thereto, and specifically substantially radially with respect to the axial flow direction through the tubular portion 21.

In the embodiment under consideration, the outlet opening 29 has a substantially rectangular slot-like configuration and incorporates the wide boundary faces 31 and the narrow faces 32. The smallest mutual distance 33 between the narrow faces 32, as indicated in FIG. 5, determines the spray angle 13 of the spray pattern in a direction transversely with respect to the strand withdrawal direction. The nozzle is mounted in the cooling system in such a manner that the wide faces 31 of the slotted outlet opening 29 are located essentially perpendicular to the lengthwise axis of the cast strand and similarly essentially perpendicular to the lengthwise axis 34 of the tubular portion 21. The spacing or distance 35 between the wide faces 31 defines the width or thickness 36 of the impingement area 37 of the spray pattern extending in the axial direction of the cast strand for a given spacing between the relevant nozzle and strand surface. The cross-section of the slotted outlet opening 29 is smaller than the cross-section of the inlet opening 24. In order to obtain a sharply defined spray pattern, it is desired that the intersection of the narrow or small faces 32 of the slotted outlet opening 29 with the neighboring inner surface 38 of the tubular portion 21 forms an angle 32′ which is less than 90° in order to produce the depicted confronting edges 27, as best shown in FIG. 5.

As discussed above, the tubular portion 21 of the nozzle body member 20 is closed at one end by a closure means, shown for instance in the form of the stationary or fixed end wall 22. The inner surface 42 of this end wall 22 which comes into contact with the incoming water is spaced a certain distance, as indicated by reference character 43, from the slotted outlet opening 29 in order to form a cavity or chamber where there can occur a certain stowing or build-up and attendant deceleration of the water.

Figure 7:
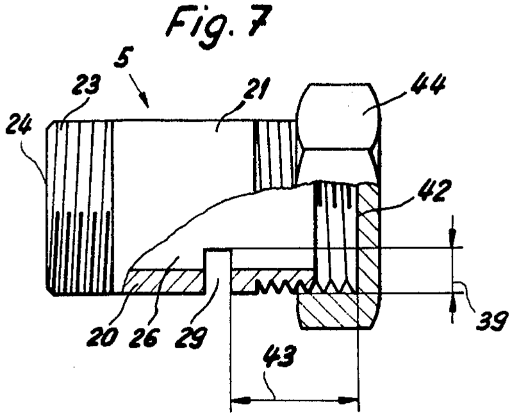
FIG. 7 is a fragmentary longitudinal sectional view of another embodiment of nozzle equipped with a modified construction of its end wall or terminal portion for use for instance in the cooling system of FIGS. 1–3.

In FIG. 7 there is shown a somewhat modified construction of nozzle 5 from that depicted in FIGS. 4–6, wherein in this case the tubular portion 21 is closed by movable end cap 44 threaded thereon. By means of this end cap 44 it is possible to vary the spacing 43 between the inner surface 42 of the closure means defined by such displaceable end cap and the slotted outlet opening 29. By varying such spacing, it is possible to appropriately incline the spray fan or pattern 3 with respect to the strand surface to a certain extent, if such is necessary. Hence, it will be recognized that while the embodiment of FIG. 7 essentially corresponds to that of FIGS. 4–6, it differs to the extent that the closure means is in the form of an axially shiftable end cap 44.

An actual arrangement for cooling a slab of thickness 9 inches and width 36 inches employed a spray nozzle 5 of the type depicted in FIG. 7, mounted at a distance 12 from the surface of the slab which amounted to 18 inches. This spray nozzle 5 was provided with a substantially rectangular slot or slotted outlet opening 29 which was milled or otherwise suitably formed at the nozzle body member consisting of a ½ inch nipple with an internal diameter of 0.625 inches. The depth 39 of the slotted outlet opening 29 measured from the outer wall of the nozzle body member 20 amounted to 0.256 inches. The slot width, in other words the spacing 35 between the wide faces 31 of the slotted outlet opening 29 amounted to 0.067 inches. This nozzle operated with a spray angle of about 90°. The distance 43 of the surface 42 of the end closure wall 22 to the slot 29 was 1 inch. The thickness 36 of the impingement area amounted to ¾ inch. It was found that, in comparison to results which can be obtained with prior art constructions of nozzles, the water distribution and the impingement force were substantially quite uniform or constant at least over the major part of the transverse width dimension of the slab.

For instance, with a water pressure of 20 psig, corresponding to a water flow of about 6.7 U.S. gallons liquid per minute, the surface impingement force on a certain test area which was exposed to the spray and located at the center of the slab, amounted to about 0.030 lbs. and remained substantially constant at other locations across the major portion or part of the width of the slab. At a water pressure of 40 psig, corresponding to a water flow of about 8.7 U.S. gallons liquid per minute, the surface impingement force on the same area substantially amounted on the average to about 0.050 lbs. for location within the major portion of the transverse extent thereof and only at the end regions did such surface impingement force drop to about 0.015 lbs. With a water pressure of 60 psig, corresponding to a water flow of about 11 U.S. gallons liquid per minute, the surface impingement force, again measured on the same area, amounted to about 0.080 lbs. and remained substantially constant at other locations over the major part or portion of the transverse extent of the slab and then only slightly dropped to about 0.070 lbs at the outer end regions thereof. By the same token, good results were attained with respect to substantially uniform water distribution at least over the major portion of the width of the slab.

If there is considered the really pronounced fluctuations in the water distribution and impingement forces which are present over the width of a strand when working with spray nozzles of the prior art cooling systems, then the above results, on a comparative basis, certainly would be considered by those skilled in the art to provide substantially uniform water distribution and substantially uniform impingement force characteristics, and particularly over at least the major portion of the transverse extent or width of the cast strand, which at least amounts to about 60 percent of such transverse width and in many instances a considerably greater proportion thereof. As a practical matter, it is not possible to obtain absolutely constant values because there always will be present certain manufacturing tolerances and errors at the spray nozzles, apart from certain fluctuations, even if slight, in the water pressure, and also the water itself may contain certain impurities which would have affect on its flow characteristics and thus such values. Still, in comparison to the results which can be attained with the prior art spray nozzles, the spray nozzles of this development can be considered to provide substantially uniform water distribution and impingement force at the surface of the slab or casting.

Figure 8:
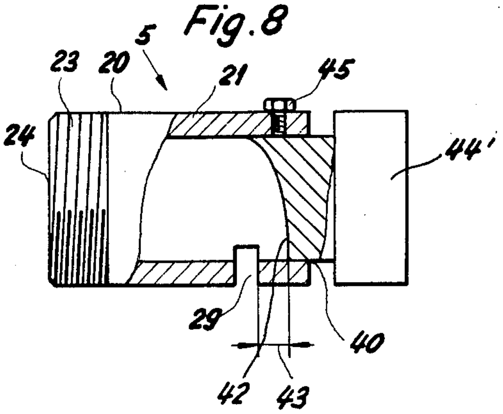
FIG. 8 is a fragmentary longitudinal sectional view of a variant construction of nozzle for use for instance in the cooling system of FIGS. 1–3.

In FIG. 8 there is illustrated a further embodiment of spray nozzle 5 which to a large extent is similar to the construction of FIG. 7. However, in this case the movable end cap 44 of the embodiment of FIG. 7 is replaced by an axially shiftable pistonlike plug 44' inserted into opening 40 of the tubular portion 21. The plug 44' can be retained in desired position by any suitable fixing means, such as a screw 45. The impingement or inner surface 42 of the plug 44' is curved, as shown.

Figure 9:
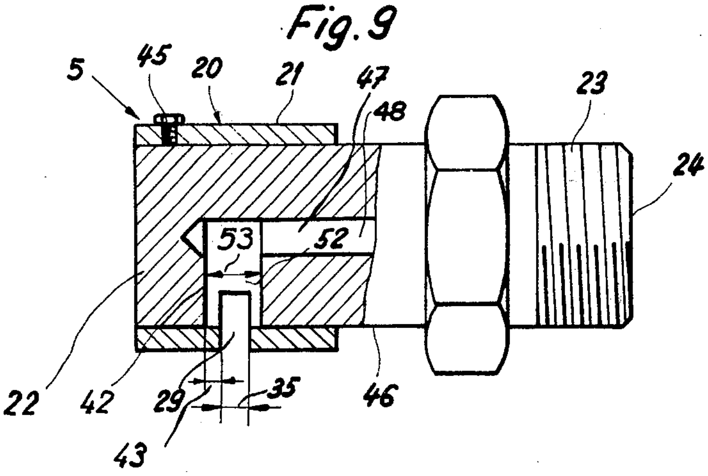
FIG. 9 illustrates a still further design of nozzle for use for instance in the cooling system of FIGS. 1–3.

FIG. 9 illustrates a variant construction of spray nozzle 5 which can be utilized in conjunction with the exemplary illustrated casting cooling system. Here the nozzle 5 will be seen to again comprise a nozzle body member 20 in the form of a tubular portion or nipple 21 which is provided with a plug-like closure insert member 46. The plug-like closure insert member 46 is provided with a machined bore 47 defining an axially extending throughflow passage 48 between the inlet opening 24 and the inner surface 42 of the end wall 22. This plug-like closure insert member 46 is also provided with an outlet opening 52 for the efflux of the liquid coolant. The tubular portion 21 of the nozzle surrounds the plug-like closure insert member 46 and such tubular portion 21 is provided with the slotted outlet opening 29 as above discussed. This tubular portion 21, which here is in the form of a nozzle sleeve, is in snug contact with the plug-like insert member 46. Further, it will be noted that the width 53 of the outlet opening 52 of the plug-like closure insert member 46 is greater in the axial extent thereof than the width 35 of the slotted outlet opening 29 of the tubular portion or nipple 21, for reasons to be explained more fully hereinafter. Furthermore, the angular extent or length of such outlet opening 52 also may be advantageously greater in the circumferential direction of the insert member 46 than the angular extent or length of the slotted outlet opening 29 in the circumferential direction of the tubular portion 21, again for reasons to be explained more fully hereinafter.

The aforedescribed construction of nozzle 5 of FIG. 9 offers a number of notable advantages. Firstly, owing to the aforementioned different widths 53 and 35 of the openings 52 and 29 respectively, and by selectively axially shifting the tubular portion 21 in the direction of the lengthwise axis of the plug-like closure insert member 46, and relative to the outlet opening 52 thereof, it is possible to shift the pattern of the coolant spray so as to assume a desired position between the guide rollers 1 of the casting cooling system. In this way the coolant spray is directed at least for the most part into the intermediate space between each two neighboring guide rollers. Also with this arrangement, it is possible to rotate the sleeve-like tubular portion 21 about the lengthwise axis of the plug-like closure insert member 46 so as to positionally orient, as desired, the pattern of the coolant spray emanating from the nozzles 5 across the width of the strand. Hence, this adjustment possibility afforded by the rotatable tubular portion 21 permits regulating the position of the pattern of the coolant spray over the transverse width of the strand. Moreover, through appropriate axial shifting or rotation of the tubular portion 21 relative to the closure insert member 46 it is also possible to close the outlet opening 29 and thus cut-off the outflow of liquid coolant. Finally, by providing a suitable sealing and mounting arrangement at the region of the inlet opening 24 where such plug-like closure insert member 46 is connected with the distributor or infeed pipe 9, and which mounting allows for rotation of such closure insert member 46, it is possible by carrying out a relative rotational movement between the insert member 46 and the sleeve-like tubular portion 21 to vary the effective size of the outlet opening 52 with respect to the slotted outlet opening 29 so as to vary the spray angle. The fixing means 45, conveniently shown in the form of a screw, can then be used to fix the adjusted position of the sleeve-like tubular portion 21 relative to the plug-like closure insert member 46.

Figure 10:
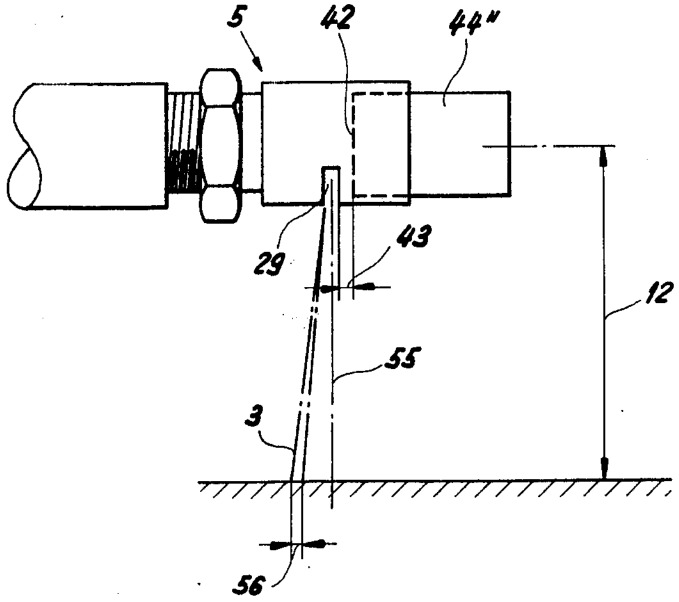
FIGS. 10 and 11 illustrate a still further embodiment of nozzle for use for instance in the cooling system of FIGS. 1 to 3.
Figure 11:
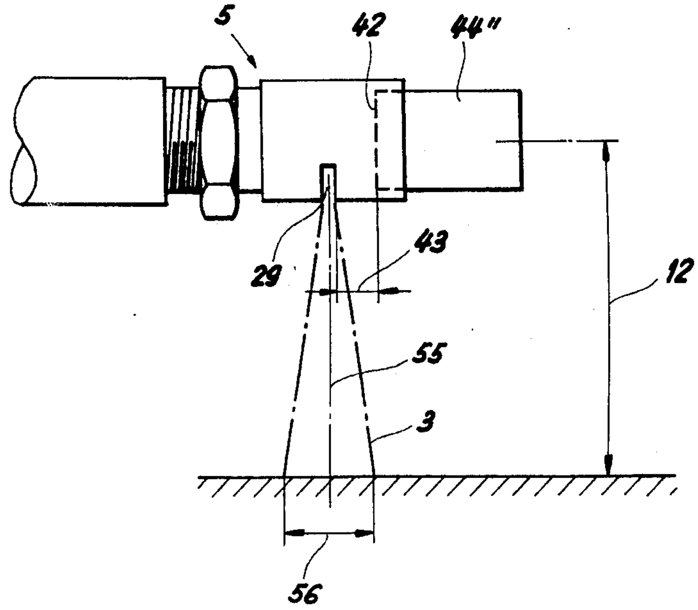

Finally, in FIGS. 10 and 11 there is depicted a still further constructional embodiment of spray nozzle 5 which to a large extent is similar to the nozzle construction of FIG. 8. Here however the axially shiftable piston-like plug 44'' is provided with a flat inner surface 42 as opposed to the curved inner surface of the plug 44' of the embodiment of FIG. 8. In all other respects, this embodiment of nozzle 5 is substantially identical to that discussed above with respect to FIG. 8, wherein however the fixing screw means 45 has been conveniently omitted from the showing of FIGS. 10 and 11 to simplify the illustration.

It has been found that the spacing or distance 43 between the inner surface 42 and the slotted outlet opening 29 has a notable effect upon the spray fan or pattern 3, and this will be explained more fully in conjunction with the nozzle construction of FIGS. 10 and 11, although the remarks made with respect thereto are equally applicable for the other constructional embodiments of nozzles disclosed herein. It was found that with a ¾ inch tubular portion or nipple 21, corresponding to an internal diameter of 0.822 inches, and when operating for instance with a water pressure of 20 psig and 40 psig and with a distance 12 of the slotted outlet opening 29 to the surface of the strand which amounted to 19½ inches and with the spacing or distance 43 of the lower end of the inner wall 42 from the slotted outlet opening 29 reduced to null, the spray makes a bow or, in other words, is arcuate and appreciably laterally deviates to one side from the plane 55 containing the central axis of the slotted outlet opening 29. While maintaining the same operating conditions but enlarging the spacing 43 to the order of ⅛ inch, it was found that the spray pattern 3 now is substantially linear i.e. bounded by substantially straight parallel lines but still appreciably laterally deviates or angles-off to one side of the plane 55 and the thickness 56 of the spray pattern in the lengthwise direction of the strand was exceedingly small. As this spacing 43 was increased to ¼ inch, the aforementioned linear spray pattern 3 still predominantly deviated to one side of the central plane although a light coolant spray also appeared at the opposite side of such central plane 55. In this case the thickness 56 of the spray pattern 3 increased but the predominant amount of coolant was heavy at one side of the plane 55 and light at the oposite side thereof. The same phenomenon was observed when the spacing 43 was increased to ⅜ of an inch. However, surprisingly it was found that when the spacing 43 amounted to ½ inch, the spray pattern 3 was substantially uniform to both sides of the central plane 55, in other words was substantially symmetrical to both sides thereof. It will thus be appreciated from the above comments that the spacing 43 plays a significant role not only upon the configuration of the spray pattern itself but also upon its spatial orientation and by maintaining such spacing so as to amount to at least ½ inch it is possible to produce a spray pattern which is substantially symmetrical with respect to the plane containing the central axis of the slotted outlet opening 29 and having a desired small and uniform thickness in the direction of the lengthwise or longitudinal axis of the casting.

The nozzle constructions depicted in FIGS. 7–11 afford the advantage that cleaning of such nozzles to free same, for instance, from mill scale, asbestos particles, or other foreign matter which might tend to collect, can be easily carried out since the closure member in each instance can be readily removed.

In the embodiments herein disclosed it is mentioned purely by way of illustration and not limitation, the nozzle body member may possess an internal diameter in the range of about 0.6 to 1.6 inches, a spacing 43 between the outlet opening 29 and the end closure wall or inner surface 42 of at least ½ inch, and typically in the range of about ½ to 4 inches, and a width 35 of the outlet opening 29 in the range of about 0.05 to 0.07 inches. The spray angle 13 may be, for instance, in a range of 60° to 120°.

Finally, it is mentioned that it is conceivable to even provide a spray nozzle arrangement formed from a pipe or conduit having a number of slotted outlet openings which are spaced in the direction of the longitudinal axis of the pipe or conduit.

While there is shown and described present preferred embodiments of the invention, it is to be distinctly understood that the invention is not limited thereto, but may be otherwise variously embodied and practiced within the scope of the following claims. ACCORDINGLY,

We claim

1. A method of cooling a continuously cast strand, particularly a steel strand, in a secondary cooling zone of a continuous casting plant, comprising the steps of arranging a spray nozzle at the region of at least two consecutively spaced guiding means for guiding the cast strand along a predetermined path of travel, moving the cast strand along said predetermined path of travel defined by said guiding means, feeding coolant into the nozzle to flow initially essentially in the axial extent thereof and then to depart therefrom in a direction extending transversely with respect to the axial flow of the coolant through the nozzle to thereby form a spray pattern of coolant, directing the spray pattern of coolant towards the surface of the cast strand to impinge thereat along an impingement area extending substantially transversely across the surface of the cast strand, producing a distribution of coolant at the impingement area of the strand which is substantially uniform at least over the major portion of the transverse width dimension thereof, said major portion of the transverse width dimension amounting to at least about 60 percent of said transverse width dimension of the strand, and substantially uniformly cooling the cast strand across its transverse width dimension by means of the impinging spray pattern of coolant.

2. The method as defined in claim 1, further including the step of controlling the departure of the spray pattern of coolant from the nozzle to regulate the spray angle thereof.

3. The method as defined in claim 1, including the step of forming a spray pattern having a relatively large width in the direction of the transverse width dimension of the strand and a relatively small and substantially uniform thickness in the direction of the longitudinal axis of the strand.

4. The method as defined in claim 1, wherein the spray pattern emanating from the nozzle extends over the entire transverse width dimension of the cast strand.

5. The method as defined in claim 1, further including the step of producing by means of said spray nozzle a spray pattern having an impingement force at the impingement area of the strand which is substantially constant at least over the major extent of the transverse width dimension thereof.

6. The method as defined in claim 1, including the step of using only a single spray nozzle for cooling each transverse width dimensional extent of the cast strand.

7. The method as defined in claim 1, wherein said major portion of the transverse width dimension amounts to at least 70 percent of the transverse width dimension of the strand.

8. The method as defined in claim 1, wherein the step of substantially uniformly cooling the cast strand across its transverse width dimension by means of the impinging spray pattern of coolant includes removing substantially the same quantity of heat over said at least major portion of the transverse width dimension of the strand.

9. A method of cooling a continuously cast strand in a secondary cooling zone of a continuous casting plant, comprising the steps of arranging a spray nozzle at the region of at least two consecutive spaced guiding means for guiding the cast strand along a predetermined path of travel, moving a cast strand along said predetermined path of travel defined by said spaced guiding means, feeding liquid coolant into the spray nozzle, forming from said liquid coolant a spray pattern which emanates from the spray nozzle and impinges the cast strand along an impingement area extending substantially transversely across the surface of the cast strand, and producing a distribution of liquid coolant over the impingement area of the strand which is substantially uniform at least over the major portion of the transverse width of the strand, in order to substantially uniformly cool the strand across its transverse width dimension, said major portion of the transverse width dimension amounting to at least about 60 percent of said transverse width dimension of the strand.

10. The method as defined in claim 9, further including the step of producing by means of the liquid coolant a spray pattern which impinges the impingement area of the surface of the cast strand with an impingement force which is substantially constant at least over the major portion of the transverse width dimension thereof.

11. The method as defined in claim 10, further including the step of delivering the liquid coolant to the spray nozzle so as to initially flow in the axial throughflow direction thereof and thereafter to depart therefrom in a direction transverse thereto.

12. The method as defined in claim 11, wherein the departing direction of the liquid coolant from the spray nozzle in the form of a spray pattern is in a direction substantially radially with respect to the axial throughflow direction of the liquid coolant through the spray nozzle.

13. The method as defined in claim 9, including the step of controlling the pressure of the liquid coolant to be in a range between 10 psig to 150 psig.

14. The method as defined in claim 9, including the step of producing a distribution of the liquid coolant which remains substantially uniform across the major extent of the impingement area of the strand throughout a range of spray angles of the spray pattern emanating from the nozzle which is between about 60° to 120°.

15. The method as defined in claim 9, especially for cooling cast strands of different rectangular cross-sections, further including the step of utilizing the same spray nozzle for cooling such different cast strands.

16. The method as defined in claim 9, wherein the spray pattern extends essentially linearly across the transverse width dimension of the cast strand.

17. The method as defined in claim 9, further including the step of controlling the spray pattern emanating from the spray nozzle to avoid any appreciable impingement with the associated guiding means for the cast strand so as to provide an essentially undisturbed spray pattern which impinges the surface of the cast strand.

18. The method as defined in claim 9, further including the step of controlling the departure of the liquid coolant from the spray nozzle so as to selectively adjust the impingement area thereof at the strand with respect to the transverse width dimension of the strand.

19. The method as defined in claim 9, especially for cooling cast strands of different chemical composition, further including the step of utilizing the same spray nozzle for cooling such different cast strands.

20. The method as defined in claim 9, especially for cooling cast strands of different rectangular cross-sections and different chemical composition, further including the step of utilizing the same spray nozzle for cooling such different cast strands.

21. The method as defined in claim 9, wherein said major portion of the transverse width dimension amounts to at least 70 percent of the transverse width dimension of the strand.

22. The method as defined in claim 9, wherein the step of substantially uniformly cooling the cast strand across its transverse width dimension by means of the impinging spray pattern of coolant includes removing substantially the same quantity of heat over said at least major portion of the transverse width dimension of the strand.

* * * * *